United States Patent
Peters et al.

(10) Patent No.: US 9,630,141 B2
(45) Date of Patent: Apr. 25, 2017

(54) MEMBRANE FILTER ELEMENT WITH MULTIPLE FIBER TYPES

(75) Inventors: Richard D. Peters, Katy, TX (US); George E. Mahley, III, Berkeley, CA (US); Atsushi Morisato, Walnut Creek, CA (US); Fatimah Binti A. Karim, Selangor (MY); Hatarmizi Bin Hassan, Selangor (MY); Zalina Binti Ali, Selangor Darul Ehsan (MY); Wan Atikahsari Wan Zakaria, Selangor (MY); Faudzi Mat Isa, Selangor (MY); Faizal Bin Mohamad Fadzillah, Kuala Lumpur (MY)

(73) Assignees: Cameron Solutions, Inc., Houston, TX (US); Petronas Carigali Sdn Bhd, Huala Lumpur (MY)

( * ) Notice: Subject to any disclaimer, the term of this patent is extended or adjusted under 35 U.S.C. 154(b) by 281 days.

(21) Appl. No.: 12/706,105

(22) Filed: Feb. 16, 2010

(65) Prior Publication Data

US 2010/0212501 A1 Aug. 26, 2010

Related U.S. Application Data

(60) Provisional application No. 61/154,219, filed on Feb. 20, 2009.

(51) Int. Cl.
*B01D 53/22* (2006.01)
*B01D 63/04* (2006.01)

(52) U.S. Cl.
CPC .............. *B01D 53/22* (2013.01); *B01D 63/04* (2013.01); *B01D 63/043* (2013.01);
(Continued)

(58) Field of Classification Search
CPC ...... B01D 53/22; B01D 63/02; B01D 53/268; B01D 2319/06; B01D 63/04;
(Continued)

(56) References Cited

U.S. PATENT DOCUMENTS 3,033,641 A * 5/1962 Thomas, Jr. .................. 210/681
3,842,515 A * 10/1974 MacDonald ....... B01D 67/0095
264/344
(Continued)

FOREIGN PATENT DOCUMENTS

EP 2113297 4/2009
WO WO 00/06357 2/2000
(Continued)

OTHER PUBLICATIONS

Roman, Ian C., Membranes for Nitrogen Generation: Recent Advances and Impact on Other Gas Separations, Seminar Presentation, Ecological Applications fo Innovative Membrane Technology in the Chemical Industry, United Nations Economic Commission for Europe, Centraro, Italy, 8 pages, May 1996.*
(Continued)

*Primary Examiner* — Anthony Shumate
(74) *Attorney, Agent, or Firm* — Gable Gotwals

(57) ABSTRACT

A natural gas stream is passed through a single membrane element that is fabricated with two or more distinct types of membrane fibers. The membrane fibers have different characteristics in order to reduce the number of membrane elements required for gas separation and to improve gas separation performance due to changing gas composition because of permeation as the gas travels through the membrane element.

12 Claims, 4 Drawing Sheets

(52) U.S. Cl.
CPC .. *B01D 2257/304* (2013.01); *B01D 2257/504* (2013.01); *B01D 2258/06* (2013.01); *B01D 2319/06* (2013.01); *Y02C 10/10* (2013.01)

(58) Field of Classification Search
CPC ............ B01D 63/043; B01D 2257/304; B01D 2257/504; B01D 2258/06
USPC ...................................................... 96/4, 7, 8
See application file for complete search history.

(56) References Cited

U.S. PATENT DOCUMENTS

| | | | | |
|---|---|---|---|---|
| 4,080,743 | A * | 3/1978 | Manos | B01D 67/0095 210/500.27 |
| 4,127,625 | A * | 11/1978 | Arisaka | B01D 69/08 210/500.29 |
| 4,130,403 | A * | 12/1978 | Cooley | B01D 53/226 166/267 |
| 4,181,675 | A * | 1/1980 | Makin | B01D 53/22 48/DIG. 5 |
| 4,230,463 | A * | 10/1980 | Henis | B01D 53/22 210/500.23 |
| 4,276,176 | A * | 6/1981 | Shorr | B01D 61/16 210/138 |
| 4,357,254 | A * | 11/1982 | Kapiloff | B01D 61/10 134/42 |
| 4,370,150 | A * | 1/1983 | Fenstermaker | B01D 53/22 95/49 |
| 4,374,657 | A * | 2/1983 | Schendel | C07C 7/005 62/624 |
| 4,386,944 | A * | 6/1983 | Kimura | B01D 53/22 95/51 |
| 4,421,529 | A * | 12/1983 | Revak | B01D 53/22 95/54 |
| 4,430,807 | A * | 2/1984 | Davis | B01D 61/362 210/640 |
| 4,466,946 | A * | 8/1984 | Goddin, Jr. | B01D 53/1412 208/289 |
| 4,561,864 | A * | 12/1985 | Klass | B01D 53/228 95/49 |
| 4,659,343 | A | 4/1987 | Kelly | |
| 4,767,533 | A * | 8/1988 | Fisher | B01D 63/021 210/321.64 |
| 4,880,441 | A | 11/1989 | Kesting et al. | |
| 5,215,554 | A * | 6/1993 | Kramer et al. | 95/47 |
| 5,358,556 | A | 10/1994 | Kaner et al. | |
| 5,407,466 | A * | 4/1995 | Lokhandwala | B01D 53/22 423/228 |
| 5,525,143 | A * | 6/1996 | Morgan | B01D 53/22 95/52 |
| 5,558,698 | A * | 9/1996 | Baker | B01D 53/22 423/229 |
| 5,702,503 | A | 12/1997 | Tse Tang | |
| 5,837,032 | A * | 11/1998 | Moll | B01D 53/22 95/45 |
| 6,271,023 | B1 * | 8/2001 | Baurmeister | B01D 53/22 210/321.64 |
| 6,565,626 | B1 * | 5/2003 | Baker | B01D 53/226 95/47 |
| 6,572,678 | B1 * | 6/2003 | Wijmans | B01D 53/226 95/47 |
| 6,630,011 | B1 * | 10/2003 | Baker | B01D 53/225 95/47 |
| 6,648,944 | B1 * | 11/2003 | Baker et al. | 95/39 |
| 6,660,062 | B2 | 12/2003 | Liu et al. | |
| 7,011,694 | B1 | 3/2006 | Ho | |
| 7,485,173 | B1 * | 2/2009 | Liu | B01D 53/228 210/640 |
| 7,575,624 | B2 * | 8/2009 | Cartwright | B01D 53/04 95/139 |
| 7,758,751 | B1 * | 7/2010 | Liu | B01D 53/228 210/321.6 |
| 8,127,936 | B2 * | 3/2012 | Liu | B01D 67/0093 210/500.39 |
| 8,127,937 | B2 * | 3/2012 | Liu | B01D 53/228 210/500.39 |
| 8,132,677 | B2 * | 3/2012 | Liu | B01D 53/228 210/500.1 |
| 8,133,308 | B2 * | 3/2012 | Lively | B01D 53/0438 165/177 |
| 2007/0080108 | A1 * | 4/2007 | Kuroda | B01D 67/0011 210/500.23 |
| 2008/0141714 | A1 | 6/2008 | Cartwright et al. | |
| 2008/0160856 | A1 | 7/2008 | Chen et al. | |
| 2010/0242723 | A1 * | 9/2010 | Liu | B01D 71/64 95/46 |

FOREIGN PATENT DOCUMENTS

| | | | | |
|---|---|---|---|---|
| WO | WO 2005082497 | * | 9/2005 | .......... B01D 61/025 |
| WO | WO 2006/044255 | | 4/2006 | |

OTHER PUBLICATIONS

Roman, Ian C. How Do You Coax 99+% Nitrogen from Membranes?, Presentation Membrane Technology and Separation Planning Conference, Newton, MA, 7 pages, Oct. 23-25, 1995.*

Perry "Perry's Chemical Engineers' Handbook," 7th Edition, McGraw-Hill pp. 22-37 to 22-69 1997.*

Membrane Technology: in the Chemical Industry Suzana Pereira Nunes, Klaus-Viktor Peinemann p. 113-116 John Wiley & Sons, Dec. 13, 2006.*

King Saud University "Reverse Osmosis" pp. 409-452, Sep. 30, 2010, http://faculty.ksu.edu.sa/Almutaz/Documents/ChE-413/Reverse%20Osmosis.pdf.*

Chatterjee "Poly(ether urethane) and poly(ether urethane urea) membranes with high H2S/CH4 selectivity" Journal of Membrane Science 135, 1997, 99-106.*

International Search Report and Written Opinion issued by the International Searching Authority (ISA/US) in PCT/US10/24437 on Apr. 12, 2010 (7 pgs.).

* cited by examiner

MEMBRANE FILTER ELEMENT WITH MULTIPLE FIBER TYPES

CROSS-REFERENCE TO PENDING APPLICATIONS

This application claims the benefit of U.S. Provisional Patent Application No. 61/154,219, filed Feb. 20, 2009.

BACKGROUND OF THE INVENTION

This invention relates generally to apparatuses used in the treatment of natural gas. More particularly, the invention relates to semi-permeable membranes used in natural gas separation processes to remove acid gas and other components from a natural gas stream so that the gas may be usable for fuel.

Much of the world's produced natural gas contains unacceptably high concentrations of acid gas—primarily $CO_2$ and $H_2S$—which must be removed before the gas is usable for fuel. The utilization of semi-permeable membranes for $CO_2$/natural gas separation is well known and spiral wound and hollow fiber membrane configurations have been used for this purpose.

Commonly used membrane configurations include fiber materials made of organic polymers and copolymers including polysulfones, polycarbonates, cellulose acetates, cellulose triacetates, polyamides, polyimides, and mixed-matrix membranes. Regardless of the fiber material used, the membrane elements are fabricated with the same type of fiber material throughout. Therefore, these membranes are limited to a single and set range of performance characteristics even though gas properties and volumes change throughout the membrane as permeation occurs. Additionally, current technology may require the operation of the membrane elements in multiple stages, so that gas is passed through multiple groups of membranes in series to partially compensate for the inefficiencies in the performance of each individual membrane stage. The result is additional equipment requirements and less than optimal membrane separation performance.

For applications that require a significant amount of $CO_2$ removal, membrane element performance can be restricted by these uniform performance characteristics. For example, a membrane fiber that performs well in higher $CO_2$ conditions may be less effective at lower $CO_2$ concentrations (and vice versa). As a result, system design is often based on a compromise limited by the performance characteristics of the membrane fiber. Because of less than optimal membrane separation performance, additional equipment and additional stages of membrane elements are required to remove high percentages of $CO_2$. In addition, the membrane separation performance achieved with a single fiber type may be less efficient overall, resulting in higher hydrocarbon losses to permeate.

In many applications, the inlet gas has a high percentage (generally 10-95%) of inlet $CO_2$ and membrane elements are used to bulk remove $CO_2$. As discussed previously, for high $CO_2$ applications, the membrane elements often are configured to operate in series with multiple stages of membranes in operation. This can result in an inefficient configuration for equipment, which requires interconnect piping between stages, thereby creating a larger overall equipment footprint and higher equipment cost. Having multiple stages of membranes may also result in difficulty in balancing the flow rates and $CO_2$ removal duties for each stage of membranes, as the amount of membrane surface area installed in each stage may have to be individually adjusted in order to maintain the desired separation performance characteristics.

Recent improvements in membrane manufacturing have led to significant increases in membrane fiber surface area in a single membrane element. For example, FIG. 1 shows older, prior art 5-inch and 12-inch diameter CYNARA® membrane elements 10 (Cameron International Corporation, Houston, Tex.) which have 500 and 2,500 square feet of active membrane fiber area, respectively. In comparison, newer larger 16-inch and 30-inch diameter membranes have been developed that have between 9,000 and 40,000 square feet of active fiber area, respectively. In the prior art—and unlike those made according to the invention disclosed herein—these larger diameter membranes are single fiber type membranes. The shear surface area of these larger diameter membranes provides greater capacity and allows for fewer stages of processing when compared to the number of processing stages needed when smaller diameter membranes are used. However, these larger membranes experience a larger gradient in, for example, $CO_2$ concentration between the inlet and outlet side of the membrane when compared to the smaller diameter membranes. This larger gradient can reduce the effectiveness of these larger diameter, single fiber type membrane elements.

For membrane gas separation applications, the relative composition of the gas changes as the gas travels through the membrane bundle and permeable components are separated from the non-permeate components. At the same time, the inlet to non-permeate gas volume is reduced as gas passes through the membrane bundle and permeation occurs, with the inlet gas first entering the membrane being higher in volume and permeable components than the non-permeate gas exiting the membrane bundle. In other words, the gas oftentimes undergoes significant and non-uniform compositional changes as it travels through the membrane. Therefore, a need exists for a membrane element that has the requisite performance characteristics for improved gas separation even as the gas volume and composition change as the gas travels through the membrane.

SUMMARY OF THE INVENTION

A membrane filter element according to this invention includes at least two different hollow fiber types in a single membrane element. The hollow fiber types are wrapped about a perforated non-permeate pipe located at the center of the filter element to provide at least two circumferential zones. The first circumferential zone includes the first hollow fiber type and is located toward the inlet gas stream (or feed) side of the element. The second (or any subsequent) circumferential zone includes the second (or subsequent) hollow fiber type and is located between the first zone and the perforated non-permeate pipe. Because the hollow fiber types are fabricated to differ from one another in targeted acid-gas selectivity and permeability performance, and because the first and second hollow fiber types are arranged in their respective zones, the selectivity and permeability performance characteristics in the first zone differ from those of the second zone as does the composition and volume of the natural gas stream to which each zone is exposed. The different performance characteristics may be a function of intentional differences in bore size, wall thickness, material, manufacturing process, or some combination thereof between the multiple hollow fiber types. For example, in a preferred embodiment, the hollow fiber types differ in permeability (capacity or flux) and selectivity (separation or alpha). Or, the hollow fiber types may differ in $CO_2$ and $H_2S$ removal capacity or hydrocarbon removal capacity. Additionally, the hollow fiber types may differ in water dew pointing or hydrocarbon dew pointing performance.

An object of this invention is to provide a single membrane filter element that effectively accomplishes a range of separation from high $CO_2$ to low $CO_2$ (or vice versa). Another object of this invention is to provide a filter element that can be optimized to two or more distinct separation functions including but not limited to $CO_2$ and $H_2S$ separation or $CO_2$ and hydrocarbon dewpointing. Yet another object of this invention is to provide for improved membrane efficiency and a better overall separation and capacity. Still yet another object of this invention is to simplify process control by reducing the number of filtering stages that require monitoring and eliminating the need for plant operators to rebalance flow rates between multiple stages of membrane filter elements or to change the relative loading between these stages. A further object of this invention is to provide for increased flexibility in accommodating changes in inlet gas composition over time. Another object of this invention is to provide a membrane filter element that creates more resistance to bypass or gas channeling and, therefore, eliminates the need for internal baffles or other gas distribution mechanisms.

DETAILED DESCRIPTION OF THE PREFERRED EMBODIMENT

Figure 1:
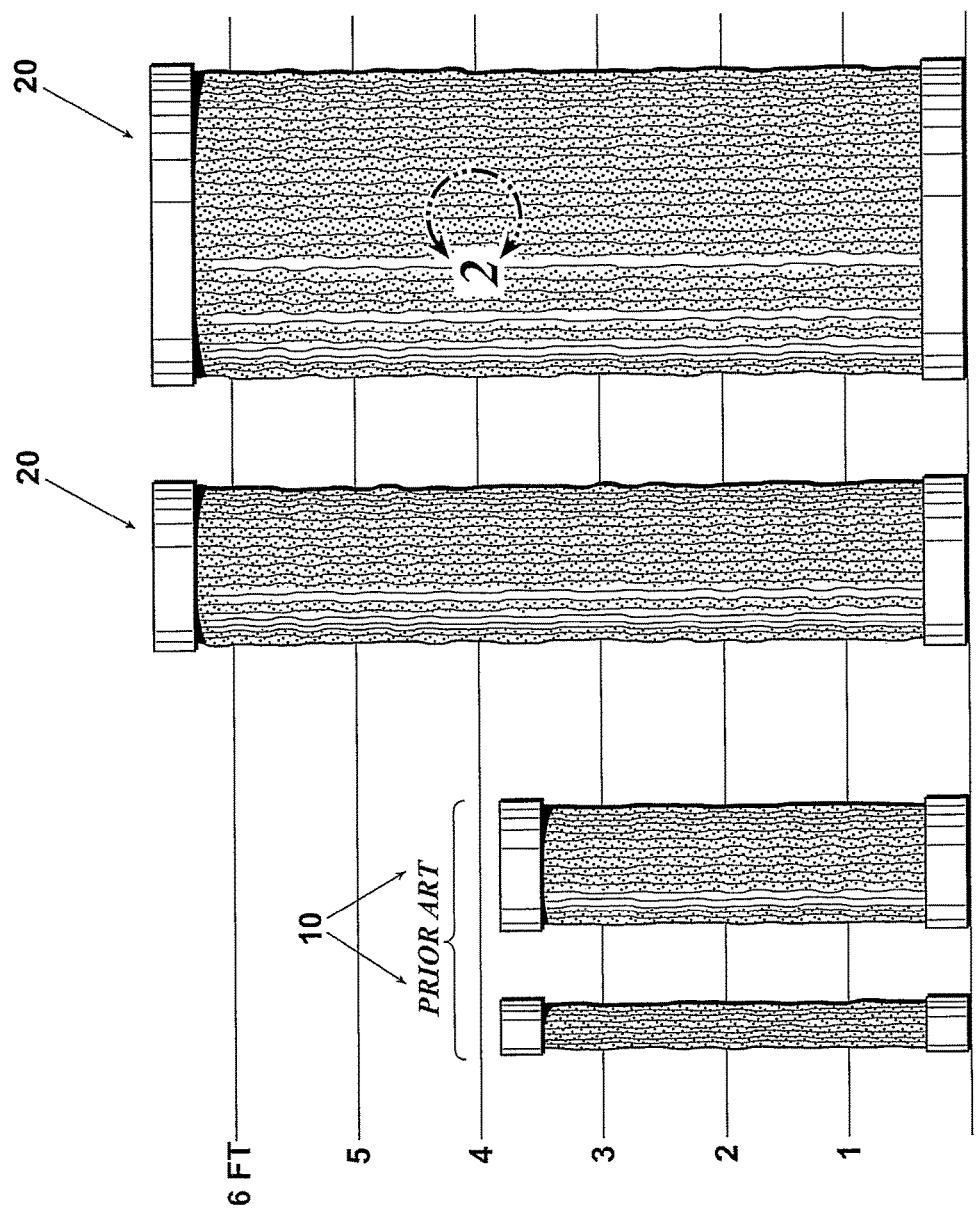
FIG. 1 compares membrane filter element sizes—ranging in diameter from about 5 to 30 inches. For the purpose of this disclosure, the two smaller diameter membrane filter elements 10 are examples of prior art single fiber type filter elements. In many applications, several of these single fiber elements must be deployed in series or stages to treat an incoming natural gas stream. A membrane element with a diameter greater than 12 inches is preferred for producing the multiple fiber membrane filter element made according to this invention. However, because of the greater bundle depth recently provided by large membrane elements, multiple fiber types may be used effectively in a single filter element, eliminating the need for several single fiber filter elements and multiple processing stages. Therefore, for the purpose of this disclosure, the two larger diameter membrane filter elements 20 are examples of a multiple fiber type filter element made according to this invention.
Figure 2:
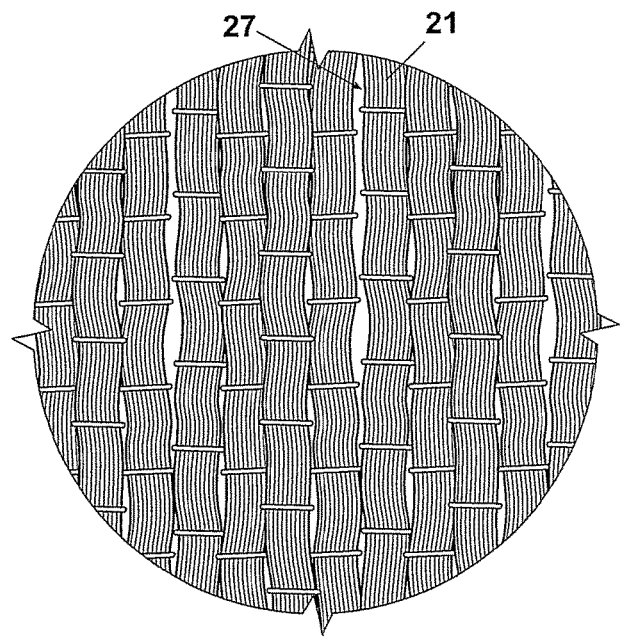
FIG. 2 is a graphical depiction of the hollow fibers that make up the multiple fiber membrane filter element 20 of FIG. 1 made according to this invention. The hollow fibers are arranged about a perforated non-permeate pipe. Optionally, the fibers may be arranged in bundles and then wrapped about the pipe.
Figure 3:
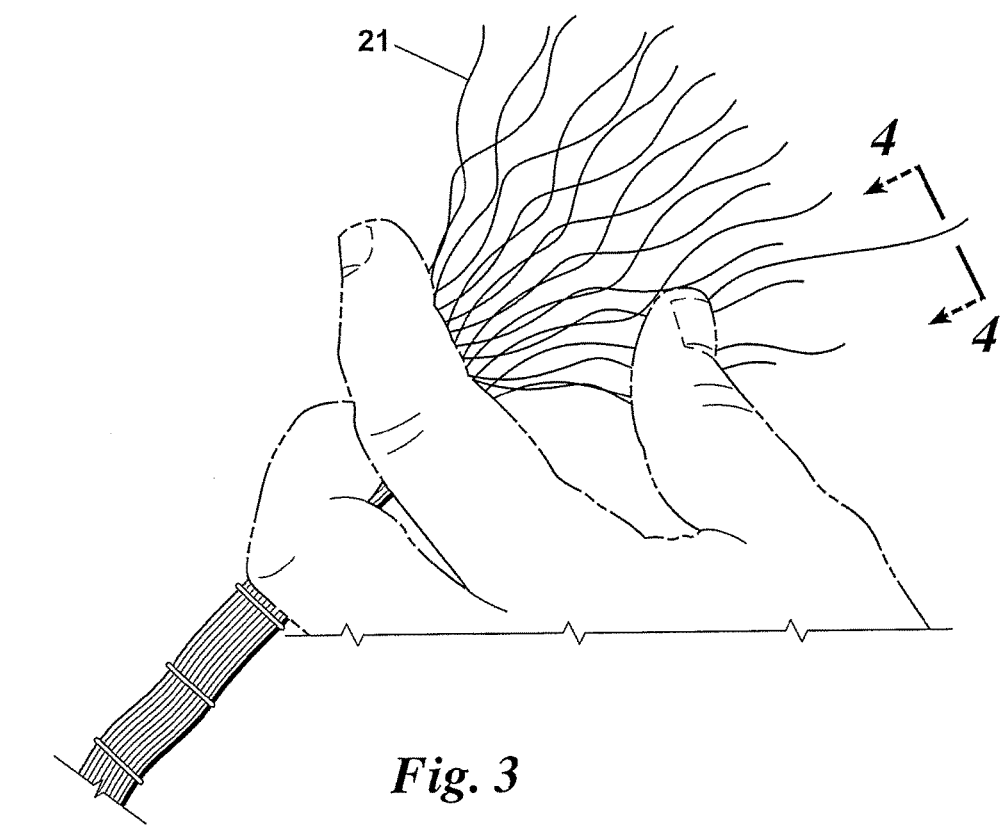
FIG. 3 is a graphical depiction of the several hollow fibers of one of the bundles of FIG. 2. The fibers are isolated to indicate the size of the individual fibers.
Figure 4:
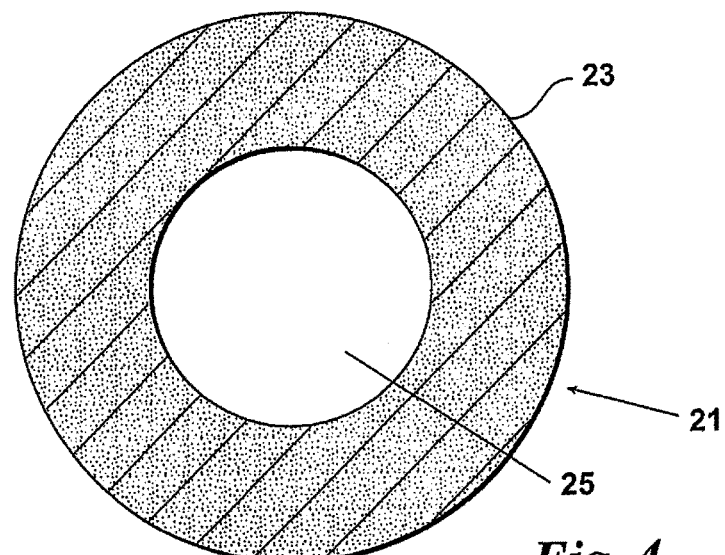
FIG. 4 is an end view of one of the hollow fibers of FIG. 3 as it might appear under magnification. The multiple fiber membrane filter element includes many hundreds of thousands of these hollow fibers.

Preferred embodiments of a membrane element that has multiple hollow fiber types will now be described by making reference to the drawings and the following elements illustrated in the drawings:

10 Single fiber membrane element 31 First circumferential zone of fibers
20 Multiple fiber membrane element 33 Second circumferential zone of fibers
21 Hollow fiber 35 Perforated non-permeate pipe
23 Wall of 21 37 Central longitudinal axis of 20 & 35
25 Bore of 21 41 Gas inlet or feed side of 20
27 Fiber bundle 43 Outlet or non-permeate side of 20
29 Bundle depth 45 Membrane division Referring now to FIG. 1, two prior art, single fiber membrane elements 10 are shown. Because membrane elements that have a diameter greater than 12 inches are preferred for producing a multiple fiber membrane element made according to this invention, the larger diameter membranes of FIG. 1 are labeled as membrane 20. Membrane element 20 takes advantage of manufacturing improvements that have enabled the production of much larger diameter semi-permeable membrane filter elements for $CO_2$/natural gas separation. Single fiber membrane elements 10 are available in sizes similar to that of membrane element 20, but membrane element 20 as disclosed herein is not a prior art membrane element. The cylindrical-shaped membrane 10, 20 is typically housed within a pressure vessel connected by way of piping to an inlet gas stream (not shown) and may be configured for an "outside in" flow or "inside out" flow. Regardless of the direction of flow, as the inlet gas stream travels through the membrane 10, 20, acid gas and other undesirable components are removed to the permeate.

Figure 6:
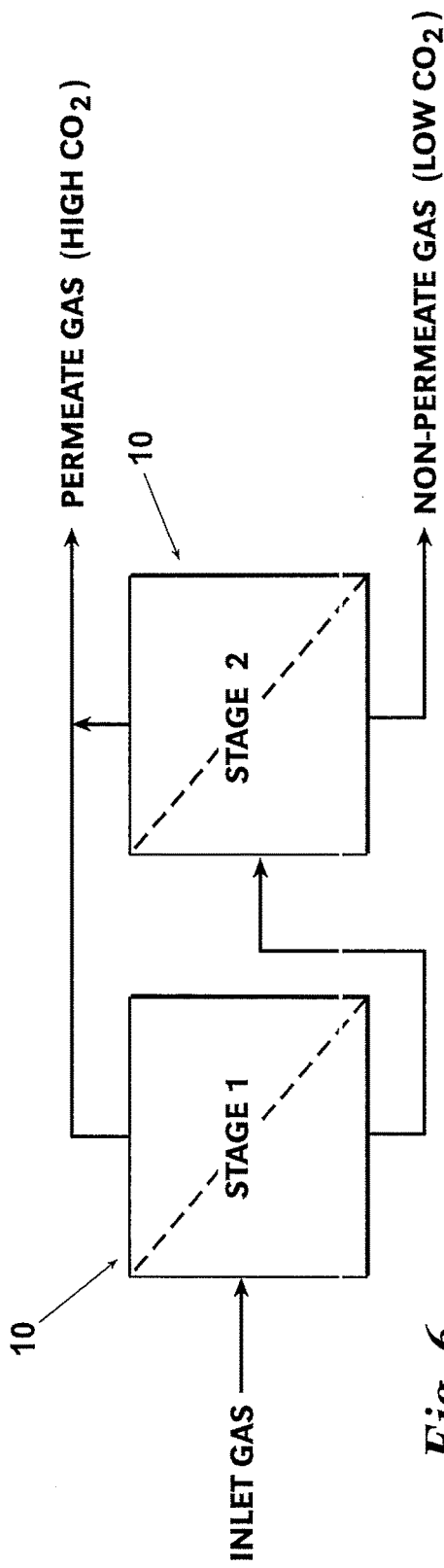
FIG. 6 is a schematic illustrating a prior art process that makes use of single fiber filter elements arranged in series, or two different single fiber type membranes with one fiber type used in Stage 1 and the second fiber type used in Stage 2.

For the purpose of comparison with multiple fiber membrane element 20, single fiber membrane element 10 generally is less than 15 inches in diameter and from about 24 inches to about 48 inches in height. Because membrane 10 does not have sufficient depth to minimize bypass—and because it employs a single fiber type that cannot account for the changes in gas volume and composition as the gas stream travels through the membrane 10—two or more membranes 10 must be arranged in series (see FIG. 6) with separation being performed in at least two stages. Selection of the fiber type for use in membrane 10 at each stage typically involves a trade-off between permeability (known as flow capacity or flux) and selectivity (called permeation rate or alpha). By way of example, as permeability increases in a polymeric membrane fiber, selectivity decreases (and vice versa).

Because of the trade-off between permeability and selectivity, some membrane fibers are better suited to higher concentrations of permeable components, while others are better suited to higher grade separations at lower concentrations of permeable components. Membrane fibers that exhibit better hydrocarbon separation attributes (higher selectivity) and lower permeability may be selected for use in membrane 10 at the first stage of processing. Conditions at this stage are typically characterized by higher gas flow rates and higher $CO_2$ concentrations. For hydrocarbon/$CO_2$ separation applications, the majority of $CO_2$ is permeated in this first stage, and the majority of "hydrocarbon losses" occur in this stage. Although the higher alpha fibers selected for use have a slightly lower flux, the fibers still operate efficiently due to the high $CO_2$ concentrations. At the second stage, however, membrane fibers that exhibit higher permeability and lower selectivity may be used. Conditions at this stage are typically characterized by lower gas flow rates and lower $CO_2$ concentrations. Therefore, it is important for element 10 to exhibit higher permeability at this stage in order to minimize the amount of membrane area and associated equipment required.

Figure 5:
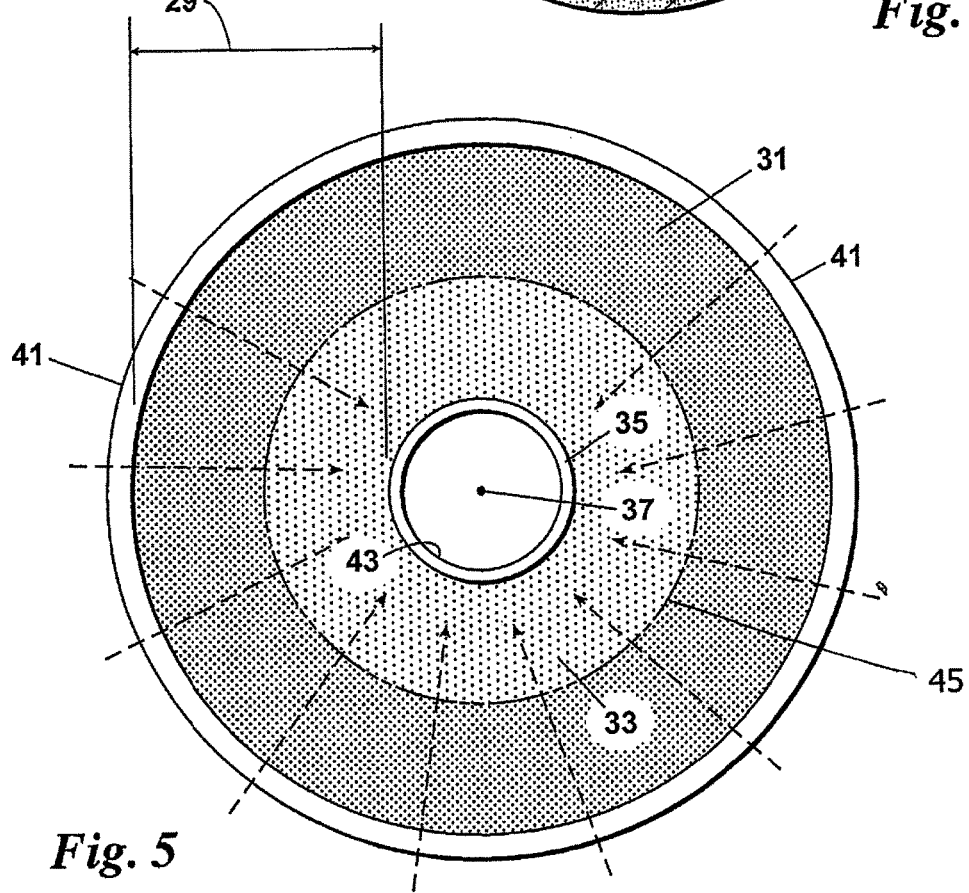
FIG. 5 is an end view of the multiple fiber membrane filter element 20 of FIG. 1 as it experiences an outside-in gas flow. The fiber types are generally arranged in two circumferential zones. Bundles located in the first circumferential zone include hollow fibers of one type and bundles located in the second zone hollow fibers of another type. Because the hollow fiber types are intentionally fabricated to differ from one another and provide a different target selectivity and permeability, the first zone exhibits different performance than does the second zone. Alternatively, gas flow could occur "inside out," flowing first through the second zone and then through the first zone.
Figure 7:
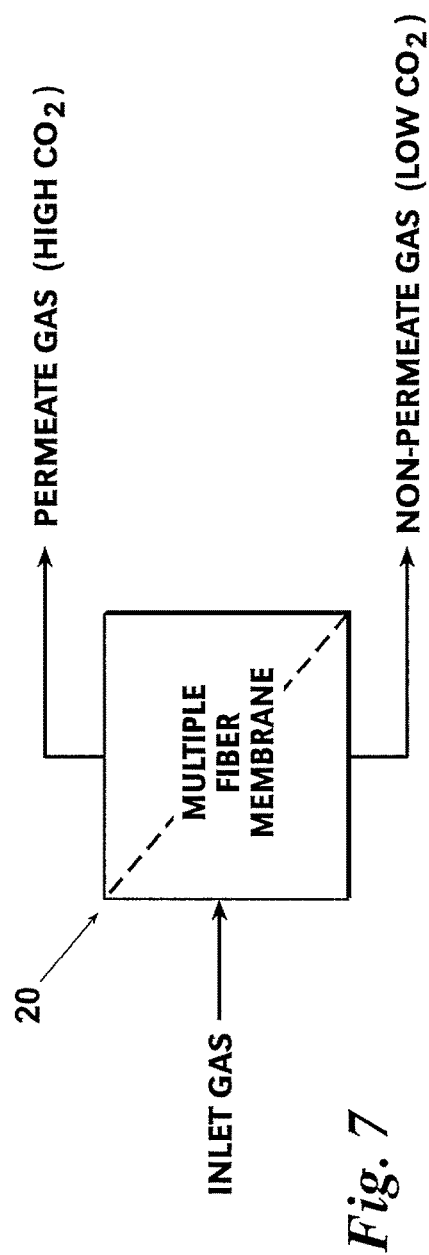
FIG. 7 is a schematic illustrating a process that makes use of a filter element made according to this invention. The multiple fiber type filter element allows for single-stage processing.

Turning now to FIGS. 5 & 7, a multiple fiber membrane element 20 made according to this invention replaces the need for multiple single fiber membranes 10 and multiple stages of separation processing. The improved processing performance provided by membrane 20 is due in part to the use of different types of hollow fibers 21 in different zones 31, 33 of the membrane 20 and the increased surface area and bundle depth 29 provided by membrane 20. For example, in one preferred embodiment membrane 20 is about 30 inches in diameter and 72 inches in height. Compared to a 12-inch diameter single fiber membrane 10, multiple fiber membrane filter element 20 generally has about 10 times the surface area and about 3 times the bundle depth 29 as that of membrane 10.

Referring now to FIGS. 2 to 5, membrane 20 includes hundreds of thousands of two or more different types of hollow fibers 21. The fibers 21 are wrapped about a perforated non-permeate tube or pipe 35 that shares a central longitudinal axis 37 with membrane 20. Alternatively, the fibers 21 may be arranged in bundles 27 and wrapped about pipe 35. Fibers 21 are arranged so permeate that permeates the wall 23 and enters the bore 25 of the hollow fibers 21 may exit through the top and bottom of membrane 20. Membrane 20 is fabricated as a divided membrane element with two distinct circumferential zones 31, 33, with line 45 indicating the division between the two zones. Fibers 21 located in a first circumferential zone 31 of the membrane 20 have a different type (or types) of hollow fibers 21 than fibers 21 located in a second circumferential zone 33. The performance characteristics of each zone 31, 33 differ because the hollow fibers 21 or combination of hollow fibers 21 fabricated and selected for use in each zone 31, 33 differ from one another.

Preferably, the hollow fibers 21 in each zone 31, 33 are selected in order to maximize the overall capacity and separation performance of membrane 20 as a gas stream passes through it, thereby reducing or eliminating the need for multiple processing or separation stages (see FIG. 7). For example, a higher separation, lower permeability hollow fiber 21 may be located nearest to the inlet or feed side 41 of the membrane 20, in circumferential zone 31, where maximum permeation flow volumes occur, in order to reduce the hydrocarbon losses to the permeate. A higher permeability but lower separation hollow fiber 21 may be located nearest to the outlet or non-permeate side 43 of the membrane 20, in circumferential zone 33, to improve capacity where $CO_2$ is lower. Alternatively, a first hollow fiber 21 having a higher permeation of one component (e.g. $H_2S$) may be bundled with a second hollow fiber 21 having higher permeation of another component (e.g. $CO_2$ or hydrocarbon dewpointing) or vice versa.

Configuring membrane 20 with multiple types of hollow fibers 21 can optimize performance by taking advantage of the performance characteristics of the different types of hollow fibers 21 included in each zone 31, 33 relative to the gas composition and more than two zones 31, 33 may be deployed. For example:

1. Combining larger bore hollow fibers 21 on the high $CO_2$ zone nearest the feed gas side 41 of element 20 and smaller bore fibers 21 on the low $CO_2$ zone nearest the non-permeate side 43 of element 20 to add more relative surface area in low $CO_2$ conditions.
2. Combining hollow fibers 21 that have greater $CO_2$ partial pressure resistance in the zone nearest the feed gas side 41 with hollow fibers 21 having higher flux in the zone nearest the non-permeate side 43.
3. Combining hollow fibers 21 that exhibit different separations, such as combining a hollow fiber 21 for dehydration with a fiber 21 for $CO_2$/hydrocarbon separation or combining a fiber 21 for $CO_2$ removal with a fiber 21 for $H_2S$ removal or for hydrocarbon dewpointing.

Membrane 20 results in fewer stages of membrane elements because it performs a much greater $CO_2$ removal duty than its single fiber predecessor membrane 10. A greater amount of $CO_2$ can be removed in membrane 20 because there is more permeation of $CO_2$, which results in a greater differential between inlet $CO_2$ and exiting non-permeate $CO_2$ inside of membrane 20. Because of this, the gas passing through membrane 20 now has a higher percentage of $CO_2$ on the feed side 41 of membrane 20 than it does in the middle or on the exiting non-permeate side 43.

By way of example, consider an inlet gas stream entering membrane 20 that contains about 50% inlet $CO_2$. As the gas passes through membrane 20 and travels toward the inner core or central longitudinal axis 37, $CO_2$ is permeated. As a result, the hollow fibers 21 located closer to the central longitudinal axis 35 of element 20 (that is, the non-permeate side 43) are presented with gas having successively lower and lower amounts of $CO_2$. For example, depending on the type of hollow fibers 21 selected for use, non-permeate gas may exit the membrane 20 with about 10% $CO_2$. In this example, although the removal of $CO_2$ through the membrane 20 is a continuous process, for simplification purposes zone 31 is a labeled a high-$CO_2$ zone where $CO_2$ is removed from about 50% to 25%. The hollow fibers 21 located farther away from the feed side 41 and toward the non-permeate side 43 reside in zone 33 or the low-$CO_2$ zone, where $CO_2$ is removed from about 25% to 10%. Again, these values are simply illustrative ones.

A membrane 20 made according to this invention provides a number of benefits. Because of the increased fiber bundle depth 29, the larger membrane 20 may replace two stages of smaller conventional membranes 10. Equivalent scale-up is not possible with spiral wound membrane elements due to the restriction in gas flow paths between layers of the membrane. $CO_2$ is selectively separated within the membrane element 20 as the flowing mixed $CO_2$/hydrocarbon gas comes in contact with the fibers 21. $CO_2$ preferentially passes through the wall 23 of each fiber 21 into the bore 25 of each fiber 21 and exits through the ends of the membrane element 20 as permeate gas. The inlet gas is reduced in $CO_2$ as the gas travels through membrane 20, resulting in the exiting non-permeate gas having a lower $CO_2$ concentration than the inlet gas.

As gas passes through membrane element 20, each successive array of fibers 21 actually processes gas with progressively lower and lower $CO_2$ content. The actual $CO_2$ content that each individual hollow fiber 21 is exposed to depends on the position of the fiber 21 in the membrane 20 relative to the feed gas side 41, with fibers 21 located near the inlet operating on higher $CO_2$ gas than fibers 21 that are located downstream, nearer to the gas outlet or non-permeate side 45. The larger bundle depth 29 thus enables the use of multiple fiber types in a single membrane element 20 and provides separation performance similar to that which previously required gas to pass through two or more membranes 10 in series. Furthermore, within membrane 20 there is a greater change in gas volume and composition due to permeation than with previous smaller membranes 10. Therefore, membrane 20 is not only processing more gas but is also operating with a greater differential in gas composition between the feed gas side 41 and the non-permeate side 43 enabling the use of multiple fiber types. With current single fiber membranes 10, the resulting membrane performance over the range of gas conditions present in the membrane 10 may be sub-optimal.

While a membrane filter element having multiple fiber types and a method for its use has been described with a certain degree of particularity, many changes may be made in the details of construction and the arrangement of components and steps without departing from the spirit and scope of this disclosure. A filter element and method according to this disclosure, therefore, is limited only by the scope of the attached claims, including the full range of equivalency to which each element thereof is entitled.

What is claimed is:

1. A membrane element for treating a natural gas stream having an amount of acid gas content, the membrane element comprising:
   a perforated non-permeate pipe having a central longitudinal axis; and
   a first cylindrical-shaped zone having a height spanning the membrane element top-to-bottom and a first bundle depth arranged coaxial to the central longitudinal axis of the perforated non-permeate pipe, the first cylindrical-shaped zone defined by a plurality of first hollow fibers, the plurality of first hollow fibers fabricated to provide, for a first composition and volume of the natural gas stream, a selected first acid gas selectivity and permeability performance throughout the first cylindrical-shaped zone and arranged so a first acid-gas permeate exits the top and the bottom of the membrane element;
   a second cylindrical-shaped zone having a height spanning the membrane element top-to-bottom and a second bundle depth arranged coaxial to the central longitudinal axis of the perforated non-permeate pipe, the second cylindrical-shaped zone defined by a plurality of second hollow fibers, the plurality of second hollow fibers fabricated to provide, for a second, different composition and volume of the natural gas stream, a selected second, different acid-gas selectivity and permeability performance throughout the second cylindrical-shaped zone and arranged so a second acid-gas permeate having a different composition than the first acid-gas permeate exits the top and the bottom of the membrane element and mixes, respectively, with the first acid-gas permeate that exited the first cylindrical-shaped zone at the top and the bottom of the membrane; said selected first and second, different selectivity and permeability performances selected to provide the natural gas stream in a single stage of processing having a reduced amount of the acid-gas content, the second cylindrical-shaped zone surrounding the perforated non-permeate pipe, the first cylindrical-shaped zone surrounding the second cylindrical-shaped zone.

2. A membrane element according to claim 1 wherein the first and second hollow fibers are fabricated to provide, relative to one another, a different target $CO_2$ selectivity and permeability performance.

3. A membrane element according to claim 1 wherein the plurality of first and second hollow fibers are fabricated to provide, relative to one another, at least one of a different target water dew pointing and a different target hydrocarbon dew pointing performance.

4. A membrane element according to claim 1 wherein the plurality of first and second hollow fibers are fabricated to provide, relative to one another, a different target $H_2S$ selectivity and permeability performance.

5. A membrane element according to claim 1 wherein the second cylindrical-shaped zone represents one portion of a total bundle depth of the membrane element and the first cylindrical-shaped zone represents the remaining portion of the total bundle depth.

6. A membrane element for treating a natural gas stream having an amount of acid gas content, the membrane element being a divided membrane element comprising:
   a first circumferential zone spanning a total height of the membrane element and defined by a plurality of first hollow fibers fabricated to provide, for a first composition and volume of the natural gas stream, a selected first acid-gas selectivity and permeability and arranged so a first acid-gas permeate exits from the top and the bottom of the membrane element; and
   a second circumferential zone spanning a total height of the membrane element and defined by a plurality of second hollow fibers fabricated to provide, for a second, different composition and volume of the natural gas stream, a selected second, different acid-gas selectivity and permeability and arranged so a second acid-gas permeate exits from the top and the bottom of the membrane element;
   the second circumferential zone surrounding a perforated non-permeate pipe, the first circumferential zone surrounding the second circumferential zone.

7. A membrane element according to claim 6 wherein the plurality of first and second hollow fibers are fabricated to provide, relative to one another, a different target $CO_2$ selectivity and permeability performance to a respective circumferential zone.

8. A membrane element according to claim 6 wherein the plurality of first and second hollow fibers are fabricated to provide, relative to one another, a different target $H_2S$ selectivity and permeability performance to a respective circumferential zone.

9. A membrane element according to claim 6 wherein the plurality of first and second hollow fibers are fabricated to provide, relative to one another, at least one of a different target water dew pointing and a different target hydrocarbon dew pointing performance to a respective circumferential zone.

10. A membrane element according to claim 6 wherein the second circumferential zone represents one portion of the bundle depth of the membrane element and the first circumferential zone represents the remaining portion of the bundle depth.

11. A membrane element according to claim 6 wherein the membrane element provides the natural gas stream in a single stage of processing having a reduced amount of the acid-gas content.

12. A membrane filter element for use in removing acid gas from a natural gas stream, the membrane filter element including a first and a second circumferential zone, the first circumferential zone spanning a predetermined bundle depth of the membrane filter element and surrounding the second circumferential zone, the second circumferential zone spanning a different predetermined bundle depth of the membrane filter element, hollow fibers in the first circumferential zone being hollow fibers selected to possess a first selectivity and permeability, hollow fibers in the second circumferential zone being hollow fibers selected to possess a second different selectivity and permeability, each circumferential zone spanning an entire height of the membrane filter element and arranged so an acid gas permeate exits a top and a bottom of the circumferential zone.

* * * * *